United States Patent Office 3,291,444
Patented Dec. 13, 1966

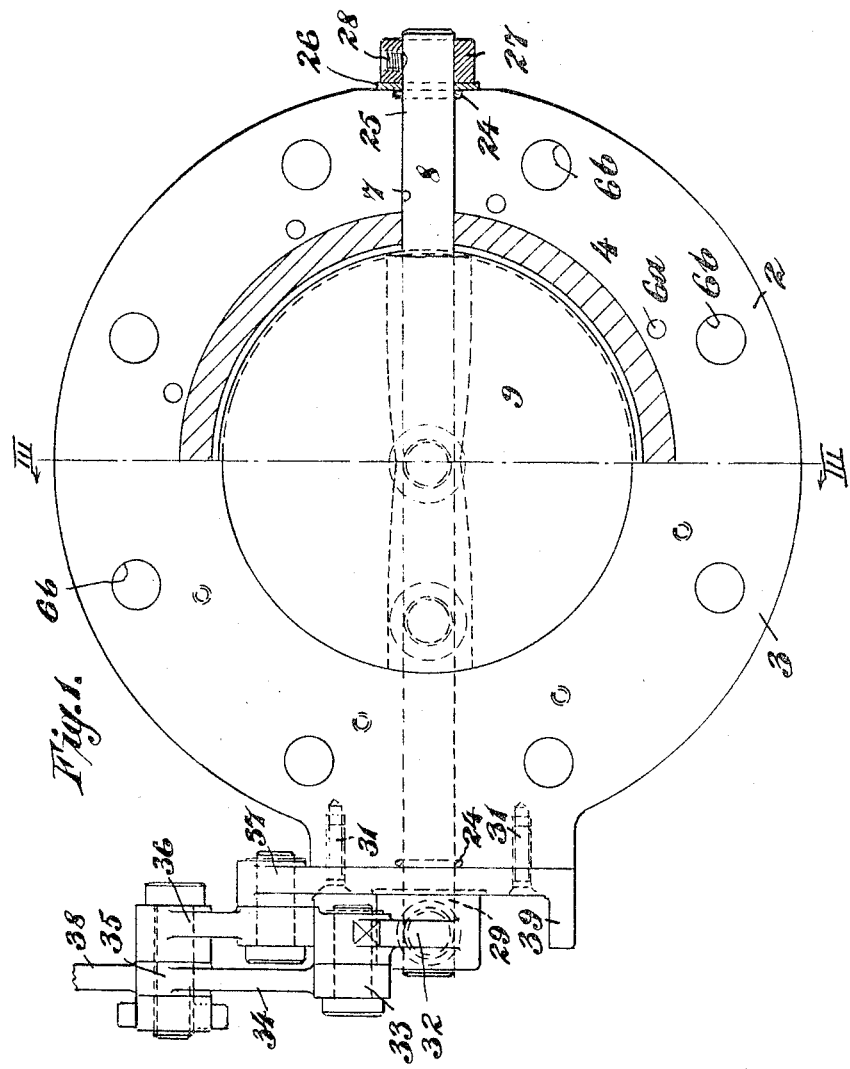

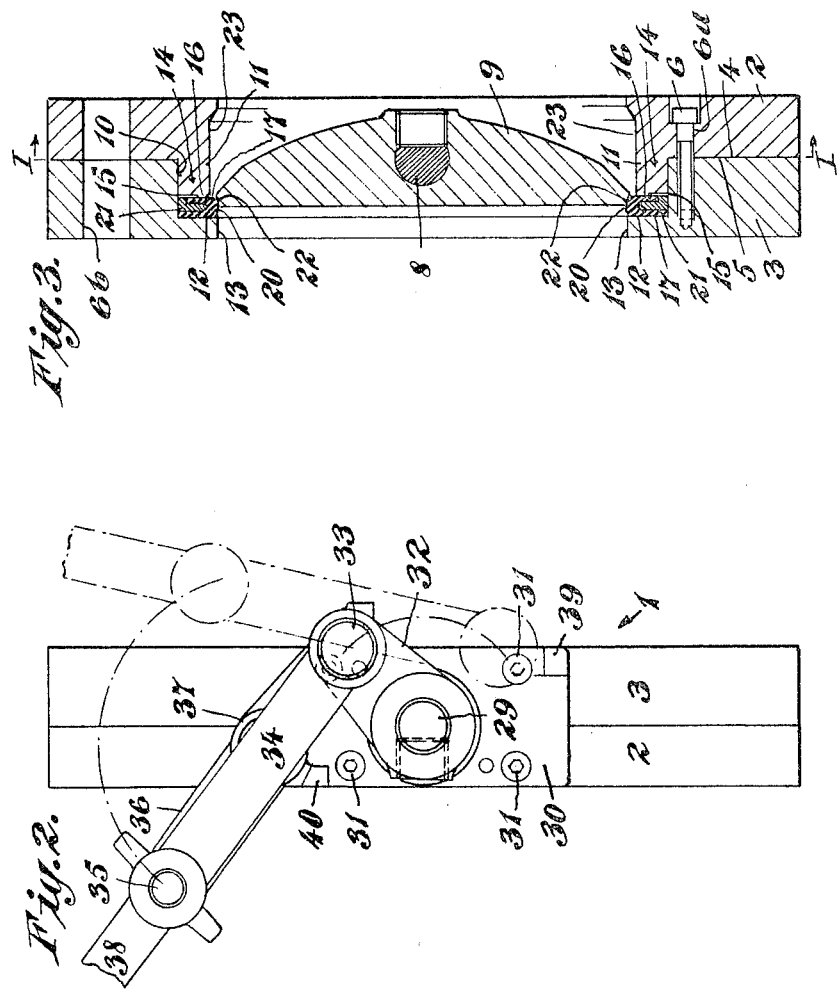

3,291,444
BUTTERFLY VALVES
Harold Victor Willis, Solihull, England, assignor to David F. Wiseman & Sons Limited, Birmingham, England, a British company
Filed Feb. 21, 1964, Ser. No. 346,464
Claims priority, application Great Britain, Mar. 28, 1963, 12,237/63
7 Claims. (Cl. 251—306)

This invention relates to butterfly valves and has for its object to provide a butterfly valve which can be more economically manufactured and more readily assembled than conventional valves of this type.

The invention consists in a butterfly valve comprising a valve body formed by two co-axially apertured members having a pair of abutting diametral faces, a closure member supported by a spindle located on each side of the closure member in a pair of complementary channels in said diametral faces with the closure member free for rotation in a flow passage defined by the apertures in said members, a seating ring mounted in a continuous recess defined between said diametral faces and surrounding said flow passage, in offset relation to said channels in the direction of the axis of said flow passage, said ring serving to provide a resilient mouth for sealing engagement with the periphery of the closure member, and means for fastening together said two members.

A typical example of the practical realisation of the invention will now be more particularly described with references to the accompanying drawings in which:

FIGURE 1 is a front view of the example partly broken away sectioned along the line I—I in FIGURE 3;

FIGURE 2 is a side view looking leftwardly at the front view shown in FIGURE 1; and FIGURE 3 is a sectional view taken along the line III—III in FIGURE 1.

The drawings show a valve body designated generally as 1 comprising a pair of co-axially apertured members 2 and 3 defining a flow passage therebetween and having confronting flat annular faces 4 and 5 adapted for liquid tight interengagement when the members 2, 3 are secured together by bolts 6 through holes 6a. Holes 6b are formed in the members 2 and 3 for use in mounting the body 1 in a pipeline. The cooperating faces 4, 5 of the members 2, 3 each incorporate a pair of diametrically radially extending semi-cylindrical channels registering with the channels in the other end face. One of these channels, 7, can be seen in FIGURE 1. The channels together provide bearings for a rotatable spindle 8 carrying a butterfly closure member 9.

The end face 4 of the member 2 is formed adjacent its aperture with an axially extending annular rebate 10, and the confronting face 5 of the member 3 is formed with a flange 11 extending partially into said rebate 10 to define an annular recess 12 between the end face of the flange 11 and the flat radial wall of the rebate 10, said recess 12 opening into the wall 13 of the flow passage through the body. The end face 14 of the flange 11 is stepped to provide an annular channel 15 adjoining the circumferential wall of the rebate 10.

A seating ring 17 is located in the recess 12 and forms a tight fit against the circumferential wall thereof. A pair of flat radially extending sides of the ring 17 lie one against the flat radial wall of the rebate 10 and the other against the end face 14 of the flange 11. The mouth of the ring 17 take the form of a pair of oppositely directed and outwardly divergent frustro-conical surfaces 20. The ring 17 is formed from resilient natural or syntheic rubber or plastic material, and is reinforced by a metal ring 21 of L-section having an end face extending into the radial surface of the ring at a location facing the channel 15 of the flange 11 as shown in FIGURE 3. According to the nature of the fluid to be handled by the valve and the working temperature, in other embodiments of the invention the metal reinforcing ring 21 may be other than L-section or may be omitted.

The closure member 9 is disc-like and has a seating surface 22 axially offset from the spindle 8 for engagement with the resilient mouth of the seating ring 17 so that the spindle 8 passes through the body 1 without interfering with the seating ring 17 in any way. The seating surface 22 has the form of a zone of a sphere lying between two parallel chordal planes axially offset from the spindle, the zone being centered on the centre of rotation of the closure member. The member 2 provided with the flange 11 is recessed at 23 to provide clearance permitting the closure member 9 to rotate, and the seating surface 22 makes a light interference fit in one frustro-conical surface 20 to close the flow passage in the closed position of the valve shown in the drawings.

The semi-cylindrical channels 7 in the valve body members 2, 3 are enlarged at their outer ends to receive fluid tight resilient O-rings 24 engaging the spindle 8. One end 25 of the spindle emerges to the exterior of the valve body 1 and is provided with a washer 26 and a collar 27 fixed to said spindle 8 by a set screw 28. The other spindle end 29 projects through a plate 30 bolted at 31 to the side of the valve body 1 and is provided with an arm 32 projecting radially from the axis of rotation of the spindle 8. The free end of the arm is pivoted at 33 to one end of a link 34 of which the other end is pivoted at 35 part way along the length of a lever 36. One end of the lever 36 is rotatably mounted at 37 to the valve body 1, and the other enl of the lever serves as a handle 38. The arm 32, link 34 and lever 36 are arranged as a valve operating toggle mechanism Turning movement of the handle 38 through approximately 80° to the broken line position shown in FIGURE 2 turns the closure member 9 through 90° to a fully open position. Projections 39 and 40 formed integrally with the plate 30 define the limits of movement of the linkage.

If required shims (not shown) may be introduced between a pair of radial faces of the seating ring 17 and the recess 12 for determining the pressure between the valve body 1 and the seating ring 17 and hence, within limits, the internal diameter of the mouth of the seating ring, so as to obtain the requisite fit of the ring 17 about the closure member 8.

I claim:

1. A butterfly valve comprising a valve body formed by two co-axially apertured members having a pair of abutting diametral faces, a closure member supported by a spindle located on each side of the closure member in a pair of complementary channels in said diametral faces with the closure member free for rotation in a flow passage defined by the apertures in said members, a seating ring mounted in a continuous recess defined between said diametral faces and surrounding said flow passage in offset relation to said channels in the direction of the axis of said flow passage, said ring serving to provide a resilient mouth for sealing engagement with the periphery of the closure member, and means for fastening together said two members.

2. A valve according to claim 1, wherein said continuous recess is defined between a rebate in the diametral face of one member and a flange projecting from the diametral face of the other member into said rebate.

3. A valve according to claim 1, wherein said channels are shaped to receive fluid tight resilient O-rings engaging the spindle.

4. A valve according to claim 1, wherein one side of said closure member is shaped as a zone of a sphere lying between two parallel chordal planes.

5. A valve according to claim 1, wherein the resilient mouth of the seating ring is shaped to provide an outwardly divergent frustro-conical surface for engagement with the periphery of the closure member.

6. A valve according to claim 1 wherein the seatnig ring is formed of resilient material reinforced with a metallic insert.

7. A valve according to claim 1, further comprising an operating arm connected to said spindle for rotating said closure member.

No references cited.

M. CARY NELSON, *Primary Examiner.*

R. C. MILLER, *Examiner.*